(12) United States Patent
Nugier et al.

(10) Patent No.: US 10,427,471 B2
(45) Date of Patent: Oct. 1, 2019

(54) TREAD COMPRISING VOIDS FOR CIVIL ENGINEERING VEHICLE TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Franck Nugier, Clermont-Ferrand (FR); Dominique Chauvin, Clermont-Ferrand (FR); Arnaud Larregain, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 294 days.

(21) Appl. No.: 15/126,943

(22) PCT Filed: Mar. 16, 2015

(86) PCT No.: PCT/EP2015/055474
§ 371 (c)(1),
(2) Date: Sep. 16, 2016

(87) PCT Pub. No.: WO2015/140122
PCT Pub. Date: Sep. 24, 2015

(65) Prior Publication Data
US 2017/0096035 A1 Apr. 6, 2017

(30) Foreign Application Priority Data
Mar. 18, 2014 (FR) ..................... 14 52242

(51) Int. Cl.
*B60C 11/11* (2006.01)
*B60C 11/24* (2006.01)
*B60C 11/03* (2006.01)

(52) U.S. Cl.
CPC ............ *B60C 11/24* (2013.01); *B60C 11/032* (2013.01); *B60C 11/11* (2013.01); *B60C 2200/065* (2013.01)

(58) Field of Classification Search
CPC ... B60C 11/24; B60C 11/032; B60C 11/0323; B60C 2200/06; B60C 2200/065; B60C 2200/08; B60C 11/11
USPC ............................ 152/154.2, 209.16, 209.17
See application file for complete search history.

(56) References Cited

U.S. PATENT DOCUMENTS 8,302,644 B2 * 11/2012 Takahashi ............. B60C 11/032
152/209.17
8,584,721 B2 * 11/2013 Fujii ...................... B60C 11/24
152/154.2

(Continued)

FOREIGN PATENT DOCUMENTS

EP 2436537 A1 4/2012
ES 2125025 * 2/1999 ............. B60C 11/12

(Continued)

OTHER PUBLICATIONS

ES 2125025, English language machine translation [epo.org] (Year: 1999).*

*Primary Examiner* — Eric Hug
(74) *Attorney, Agent, or Firm* — Dickinson Wright PLLC

(57) ABSTRACT

The tread has a wearable thickness of material EMU and has raised elements delimited by grooves. Each solid part has a contact face and a cavity with a depth greater than 50% of the wearable thickness. Each cavity opens onto the contact face when new and is delimited by a wall surface and a bottom surface. Each wall surface deliminates a cavity that (Continued)

intersects the contact face along a corner edge contour that has a geometry that has a major axis which is at least 1.5 times the length of a minor axis when new. For any tread surface down to a predefined wear level, the level is at most 30% of the wearable thickness of material EMU, and the angle between the major axis and the circumferential direction is between 0 and 40 degrees. After the wear level, the angle is greater than 40 degrees.

9 Claims, 1 Drawing Sheet

(56) References Cited

U.S. PATENT DOCUMENTS

| | | | | |
|---|---|---|---|---|
| 2003/0205076 | A1* | 11/2003 | Shimura | B60C 11/24 73/8 |
| 2006/0037683 | A1* | 2/2006 | Cuny | B60C 11/24 152/154.2 |
| 2010/0307650 | A1* | 12/2010 | De Benedittis | B60C 11/0306 152/209.18 |
| 2012/0000585 | A1* | 1/2012 | Lhospitalier | B60C 11/12 152/209.18 |
| 2012/0060989 | A1* | 3/2012 | Kuwajima | B60C 11/12 152/209.18 |
| 2013/0086821 | A1 | 4/2013 | Lussier | |
| 2013/0105052 | A1* | 5/2013 | Tanaka | B60C 11/0306 152/209.17 |
| 2014/0299242 | A1* | 10/2014 | Chauvin | B60C 11/032 152/209.8 |

FOREIGN PATENT DOCUMENTS

| | | | | |
|---|---|---|---|---|
| WO | | 9601190 A1 | 1/1996 | |
| WO | WO 2013/014253 | * | 1/2013 | B60C 11/11 |

* cited by examiner

TREAD COMPRISING VOIDS FOR CIVIL ENGINEERING VEHICLE TIRE

CROSS-REFERENCE TO RELATED APPLICATION

The present invention claims priority to PCT International Patent Application Serial No. PCT/EP2015/055474 filed Mar. 16, 2015 entitled "Tread Comprising Voids For Civil Engineering Vehicle Tire," which claims the benefit of FR Patent Application Serial No. 1452242 filed Mar. 18, 2014, the entire disclosures of the applications being considered part of the disclosure of this application and hereby incorporated by reference.

BACKGROUND OF THE INVENTION

1. Field of the Invention

The present disclosure relates to a tire tread for a civil engineering vehicle such as a dumper and more particularly to certain elements of the tread pattern of such a tread.

2. Related Art

The working of mines requires recourse to the use of suitable vehicles notably able to carry very heavy loads of the materials processed in these mines, covering longer or shorter distances over ground with some degree of slope and often covered with bodies that may impair grip performance either in terms of traction or in terms of braking or even in terms of steering. These vehicles with a high material bearing capability are fitted with tires of suitable size and capacity to allow very large quantities of materials to be moved around. These tires are of very large dimensions, notably far bigger than the tires intended for heavy goods vehicles.

Each of these tires is provided with a tread having a large thickness (at least 60 mm) of wearable material. Furthermore, this tread is provided with a tread pattern made up of cavities such as grooves and sipes that generate both cavity parts capable of collecting material or water as that part of the tire enters the contact patch during running, and corner edges which are useful in meeting the requirements in terms of grip, whether this be in terms of traction or in terms of braking or even in terms of cornering.

The constraints on the use of the vehicles are such that it is common practice to fit new tires to the front axle of such vehicles and remove them and fit them to the rear axle in order to finish wearing away their tread. The changeover is generally performed when the tread wear is equal to or close to one third of the wearable thickness of material.

It is also known practice to form cavities or voids in order to allow the more solid and thick parts such as the edges axially on the outside of the tread to cool. These cavities are generally open either laterally to the tread or onto the tread surface.

The applicant companies have set themselves the objective of optimizing the design of tread pattern for a tire of this type of vehicle subject to the constraint of changing its location on the vehicle during the life of the tire while at the same time enjoying the benefit of the effect of cooling the solid parts through the use of improved cavities.

Definitions:

In this document, a radial direction means a direction perpendicular to the axis of rotation of the tire (this direction corresponds to the direction of the thickness of the tread).

A transverse or axial direction means a direction parallel to the axis of rotation of the tire.

A circumferential direction means a direction tangential to any circle centered on the axis of rotation. This direction is perpendicular both to the axial direction and to a radial direction.

An equatorial mid plane is a plane perpendicular to the axis of rotation and passing through the points on the tire that are radially furthest from the said axis. In the case of a tread, this plane divides the tread across its width into two halves of equal width.

A rib is a raised element formed on a tread, this element extending in the circumferential direction and making a circuit of the tire. A rib comprises two lateral walls at a contact face, the latter being intended to come into contact with the roadway during running.

A block is a raised element formed on a tread, this element being delimited by circumferentially oriented grooves and transversely oriented grooves. A block comprises more than two lateral walls and a contact face.

A cut generically denotes either a groove or a sipe and corresponds to the space delimited by walls of material that face one another and are distant from one another from a non-zero distance (referred to as the "width of the cut"). It is precisely this distance that differentiates a sipe from a groove; in the case of a sipe, this distance is suited to allowing the opposite walls delimiting the said sipe to come at least partially into contact when that part of the tire is in the contact patch in which the tire is in contact with the roadway. In the case of a groove, the walls of this groove cannot come into contact with one another under normal running conditions.

A tread has a maximum thickness EMU of material that can be worn away during running; once this thickness has been achieved, the tire needs to be replaced by another new tire.

A cavity is a void volume formed in a raised element of a tread. This cavity is delimited, on the contact face of the raised element, by a corner edge forming a contour that is closed on itself or by a plurality of corner edges forming a closed contour.

SUMMARY OF THE INVENTION AND ADVANTAGES

The present disclosure seeks to propose a tread for a tire of a civil engineering work vehicle, this tread having a wearable thickness of material EMU at least equal to 60 mm and being provided with a tread pattern design determined by the presence of grooves, sipes and cavities more generically.

To this end, one subject of the disclosure is a tread for a tire of a civil engineering work vehicle, this vehicle being intended to carry very heavy loads (at least 20 tons at the rated pressure per tire), this tread having a wearable thickness of material EMU measured when new between a surface (referred to as the tread surface) that is intended to come into contact with the ground and a wear limit. This tread surface extends circumferentially all around the tire and is axially bounded by edge parts defining a maximum width for this tread. When the wear limit is reached, the tire has to be changed or retreaded, which means to say fitted with a new tread.

This tread comprises solid parts forming raised elements delimited by grooves, each solid part comprising a contact face and, opening onto this contact face, at least one cavity of maximum depth at least greater than 30% of the wearable thickness EMU, each cavity opening onto the tread surface when new and being delimited by a wall surface and a bottom surface. Each wall surface delimiting a cavity intersecting the tread surface along a corner edge contour having a geometry exhibiting a major axis and a minor axis, the length of the major axis being at least equal to 1.5 times the length of the minor axis when new.

This tread is also such that:

for any tread surface down to a predefined level of wear, this level being less than the depth of each cavity, the corner edge contour of each cavity considered on the said tread surface is such that the angle made by the major axis and the circumferential direction is at least equal to 0 degrees and at most equal to 40°, and in that:

from the predefined wear level onwards, the angle made by the major axis and the circumferential direction is greater than 40 degrees and is greater than the angle made by the major axis and the circumferential direction on the tread surface when new.

A major axis means a segment of straight line passing through two furthest-spaced points of the corner edge profile on the tread surface considered; a minor axis means a segment of straight line intersecting the major axis at its middle and perpendicular to this major axis. The respective lengths of the major axis and of the minor axis are measured between the points of intersection of the predefined segments with the corner edge profile.

For preference, each cavity has a maximum depth at least greater than 50% of the wearable thickness EMU.

It is advantageous for the predefined wear level to be equal to or greater than one third of the depth of the cavities.

For preference, the cavities are formed on the edge parts axially delimiting the tread.

For preference, the length of the major axis after predefined wear is at most equal to 1.25 times the length of the minor axis.

In an advantageous alternative form, the angle that the major axis makes with the circumferential direction varies discontinuously, the discontinuity occurring at the predefined wear level.

In another advantageous alternative form, the angle that the major axis makes with the circumferential direction varies continuously and increasingly between the tread surface when new and the bottom of each cavity.

In order to reduce the risk of picking up foreign bodies inside the cavities it is possible to mold cavities the walls of which form a relief angle such that the surface of each cavity on the tread decreases with tread wear.

The disclosure also relates to a tire provided with a tread as defined hereinabove, this tire being intended to be fitted first of all to a front axle of a civil engineering vehicle intended to carry very heavy loads. This tire is then removed from the front axle when it reaches a predefined wear level and mounted on a rear axle of this vehicle or of another vehicle of the same type.

When the tire is in the new configuration, the preferred orientation and the ratio of the lengths of the major axis and of the minor axis are beneficial in obtaining good cornering grip whereas after a predefined amount of wear, the increased orientation of the major axis with respect to the circumferential direction and the reduced ratio between the lengths of the major and minor axes means that when this tire is mounted on a rear axle it becomes possible to obtain good performance in terms of traction and braking.

Further features and advantages of the disclosure will become apparent from the description given hereinafter with reference to the attached drawing which, by way of non-limiting example, shows one embodiment of the subject matter of the disclosure.

DETAILED DESCRIPTION OF THE ENABLING EMBODIMENT

Figure 1:
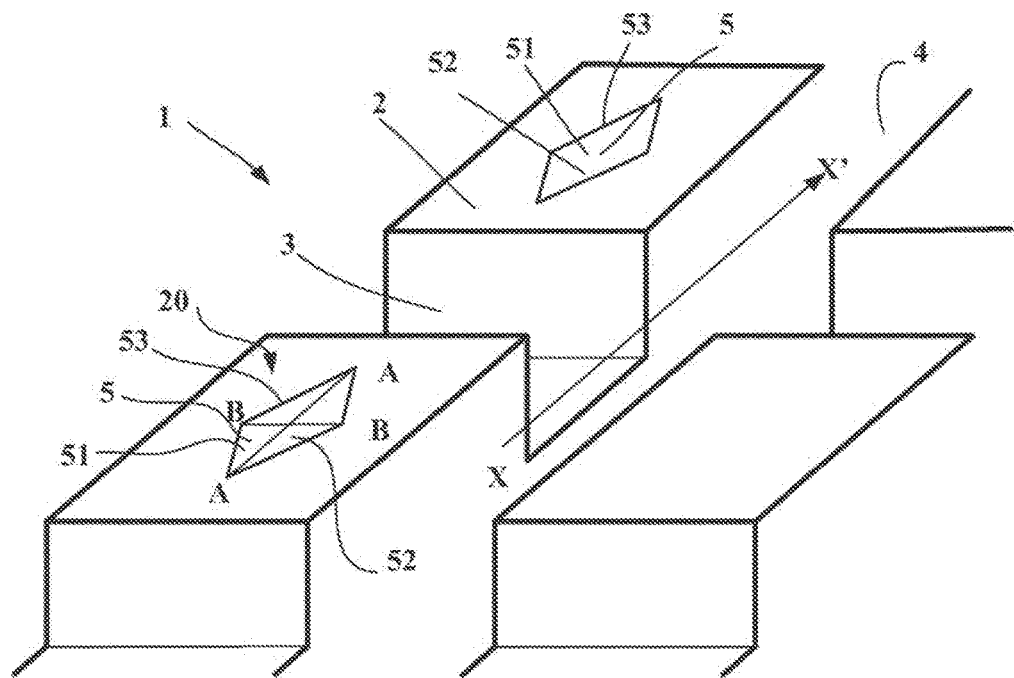
FIG. 1 depicts a partial view of a tread pattern of a tread according to the disclosure, this tread being depicted as new.

FIG. 1 depicts a partial view of an alternative form of tread pattern for a tread 1 according to the disclosure, this tread 1 being depicted as new, namely prior to any running.

In this FIG. 1 it is possible to distinguish a part forming a shoulder of the tread, this part being made up of a plurality of blocks 2 delimited by transverse grooves 3 intersecting a groove 4 that runs circumferentially. These transverse and circumferential grooves have the same depth corresponding substantially to the thickness EMU of material to be worn away during running. In this particular instance, the depth of the grooves is equal to 100 mm.

In this figure, the circumferential direction is embodied by an arrow XX' extending along the circumferential groove.

Each block 2 of the shoulder part comprises lateral faces and a contact face 20 intended to come into contact with the ground during running. The intersections between the contact face 20 and the lateral faces in this instance form four corner edges of benefit in tire traction.

Furthermore, molded into each block 2 is a single cavity 5 having a depth substantially equal to the depth of the grooves delimiting this block (around 100 mm). Each cavity 5 opens onto the contact face 20 of the block 2 and is delimited by a lateral wall 51 and a bottom wall 52. Each cavity 5 intersects the contact face 20 along a corner edge contour 53, this contour 53 having a lozenge-shaped geometry, this lozenge having a major axis AA and a minor axis BB.

In this particular instance, and when new, the length of the major axis AA is 1.5 times greater than the length of the minor axis BB.

In this configuration, the tire intended to be fitted to a vehicle intended to carry very heavy loads is fitted on a front axle.

Figure 2:
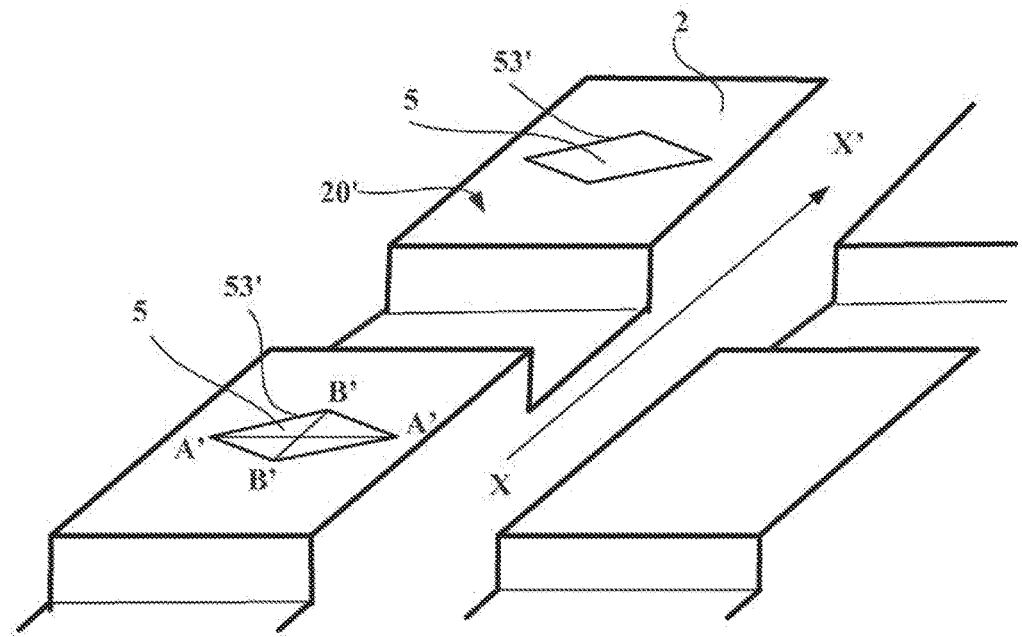
FIG. 2 shows the tread of FIG. 1 after part wear corresponding to one third of the wearable thickness of material.

When the tread reaches a predefined level of part wear, the tread according to the disclosure exhibits the configuration shown in FIG. 2. In this particular instance, the predefined level of wear is equal to one third of the total wearing thickness of material.

In FIG. 2, which shows the tread of FIG. 1 after part wear corresponding to one third of the depth of the cavities, it is possible on each block 2 of the shoulder part to distinguish the presence of a cavity 5 of which the total depth has decreased and of which the corner edge contour 53' on the contact face 20' has maintained a lozenge shape, although this shape has rotated about an axis perpendicular to the contact face.

In this particular instance, the angle that the major axis A'A' makes is equal to 90 degrees to the circumferential direction (embodied by the arrow XX').

This configuration is then maintained until the tread is fully worn.

In an alternative form not shown here, the cavity formed on the blocks is such that the surface delimited by the corner edge contour on the contact face is at a maximum when new and decreases progressively with wear while at the same time exhibiting a progressive rotation of its major axis with wear. The benefit of such an arrangement is that it makes the tread easier to mold and to remold.

By virtue of the provisions according to the disclosure as described, notably with these alternative forms thereof, it has been possible substantially to improve the traction of the tires longitudinally and transversely while at the same time reducing the amount of heat during operation, and to do so whatever the degree of tread wear.

The disclosure that has been described must of course not be restricted to these examples and various modifications can be made thereto without departing from the scope defined by the claims.

What is claimed is:

1. A tread for a tire of a civil engineering work vehicle intended to carry very heavy loads with at least 20 tons at the rated pressure per tire, comprising:
    said tread having a wearable thickness of material EMU measured between a tread surface that is intended to come into contact with the ground and a wear limit;
    said tread surface extending circumferentially all around the tire and being axially bounded by edge parts defining a maximum width for said tread;
    said tread comprising solid parts forming raised elements delimited by circumferential grooves and transverse grooves intersecting said circumferential grooves;
    each solid part comprising a contact face and, opening onto said contact face, at least one cavity of maximum depth at least greater than 30% of said wearable thickness EMU;
    each cavity opening onto said contact face when new and being delimited by a wall surface and a bottom surface;
    each wall surface delimiting said cavity intersecting said contact face along a corner edge contour having a geometry comprising a major axis AA extending across said cavity and a minor axis BB extending across said cavity;
    a length of said major axis AA being at least equal to 1.5 times a length of said minor axis BB when new; and
    wherein for any tread surface down to a predefined level of wear, said predefined level of wear being less than a depth of each cavity, said corner edge contour of each cavity considered on said tread surface is such that an angle made by said major axis AA and a circumferential direction is at least equal to 0 degrees and at most equal to 40 degrees, and
    wherein from said predefined wear level onwards, said angle made by said major axis A' A' and said circumferential direction is greater than 40 degrees.

2. The tread according to claim 1 wherein each cavity has a maximum depth at least greater than 50% of said wearable thickness EMU.

3. The tread according to claim 2 wherein said predefined wear level is equal to or greater than one third of said depth of the cavities.

4. The tread according to claim 1 wherein said cavities are formed on said edge parts axially delimiting said tread.

5. The tread according to claim 1 wherein said angle that said major axis AA makes with said circumferential direction varies discontinuously, said discontinuity occurring at said predefined wear level.

6. A tire provided with a tread as defined in claim 1, said tire being intended to be fitted first of all to a front axle of a civil engineering vehicle intended to carry very heavy loads, said tire then being removed from the front axle when it reaches a predefined wear level and mounted on a rear axle of the same type of vehicle.

7. The tread according to claim 1 wherein said predefined wear level is about one third of said depth of the cavities.

8. A tread for a tire of a civil engineering work vehicle intended to carry very heavy loads with at least 20 tons at the rated pressure per tire, comprising:
    said tread having a wearable thickness of material EMU measured between a tread surface that is intended to come into contact with the ground and a wear limit;
    said tread surface extending circumferentially all around the tire and being axially bounded by edge parts defining a maximum width for said tread;
    said tread comprising solid parts forming raised elements delimited by grooves;
    each solid part comprising a contact face and, opening onto said contact face, at least one cavity of maximum depth at least greater than 30% of said wearable thickness EMU;
    each cavity opening onto said contact face when new and being delimited by a wall surface and a bottom surface;
    each wall surface delimiting said cavity intersecting said contact face along a corner edge contour having a geometry comprising a major axis AA and a minor axis BB;
    a length of said major axis AA being at least equal to 1.5 times a length of said minor axis BB when new; and
    wherein for any tread surface down to a predefined level of wear, said predefined level of wear being less than a depth of each cavity, said corner edge contour of each cavity considered on said tread surface is such that an angle made by said major axis AA and a circumferential direction is at least equal to 0 degrees and at most equal to 40 degrees, and
    wherein from said predefined wear level onwards, said angle made by said major axis A' A' and said circumferential direction is greater than 40 degrees and is greater than said angle made by said major axis AA and said circumferential direction on said tread surface when
    wherein said length of said major axis AA after said predefined wear level is at most equal to 1.25 times said length of said minor axis.

9. A tread for a tire of a civil engineering work vehicle intended to carry very heavy loads with at least 20 tons at the rated pressure per tire, comprising:
    said tread having a wearable thickness of material EMU measured between a tread surface that is intended to come into contact with the ground and a wear limit;
    said tread surface extending circumferentially all around the tire and being axially bounded by edge parts defining a maximum width for said tread;
    said tread comprising solid parts forming raised elements delimited by grooves;
    each solid part comprising a contact face and, opening onto said contact face, at least one cavity of maximum depth at least greater than 30% of said wearable thickness EMU;
    each cavity opening onto said contact face when new and being delimited by a wall surface and a bottom surface;
    each wall surface delimiting said cavity intersecting said contact face along a corner edge contour having a geometry comprising a major axis AA and a minor axis BB;
    a length of said major axis AA being at least equal to 1.5 times a length of said minor axis BB when new; and
    wherein for any tread surface down to a predefined level of wear, said predefined level of wear being less than a depth of each cavity, said corner edge contour of each cavity considered on said tread surface is such that an angle made by said major axis AA and a circumferential direction is at least equal to 0 degrees and at most equal to 40 degrees, and wherein from said predefined wear level onwards, said angle made by said major axis A' A' and said circumferential direction is greater than 40 degrees and is greater than said angle made by said major axis AA and said circumferential direction on said tread surface when wherein said angle that said major axis AA makes with said circumferential direction varies continuously and increasingly between said tread surface when new and said bottom of each cavity.

* * * * *